March 14, 1961  G. H. STIMSON  2,974,418
HELIX TESTER

Filed June 12, 1958  6 Sheets-Sheet 1

INVENTOR.
GLEN H. STIMSON
BY Frank G. Bower
his ATTORNEY

March 14, 1961  G. H. STIMSON  2,974,418
HELIX TESTER

Filed June 12, 1958  6 Sheets-Sheet 2

INVENTOR.
GLEN H. STIMSON
BY Frank G. Bauer
his ATTORNEY

March 14, 1961 G. H. STIMSON 2,974,418
HELIX TESTER
Filed June 12, 1958 6 Sheets-Sheet 3
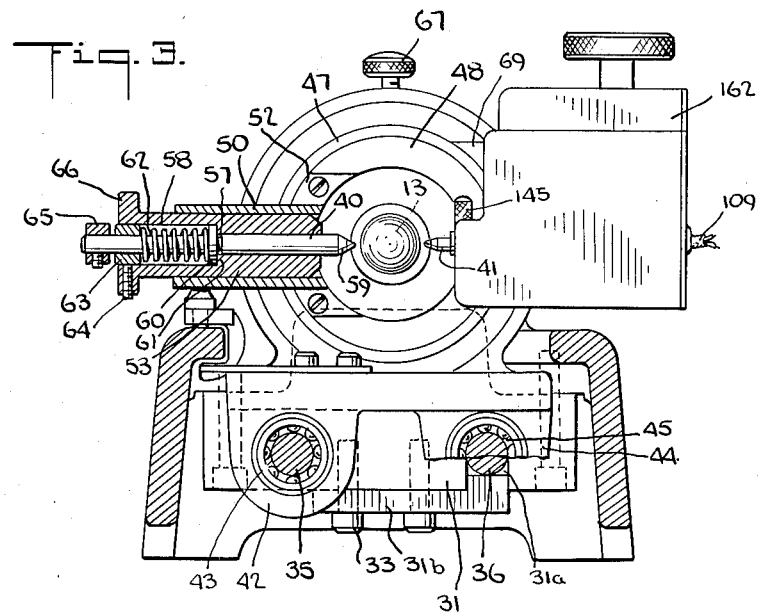
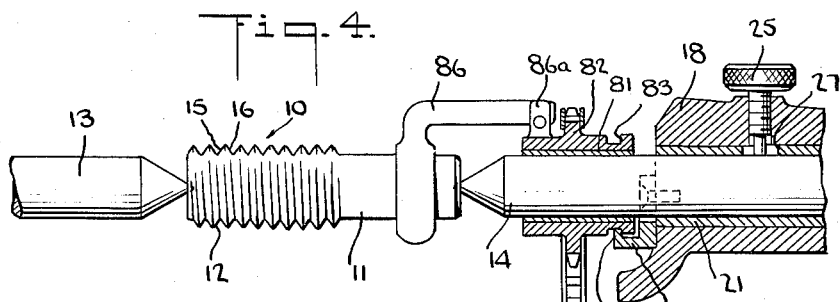
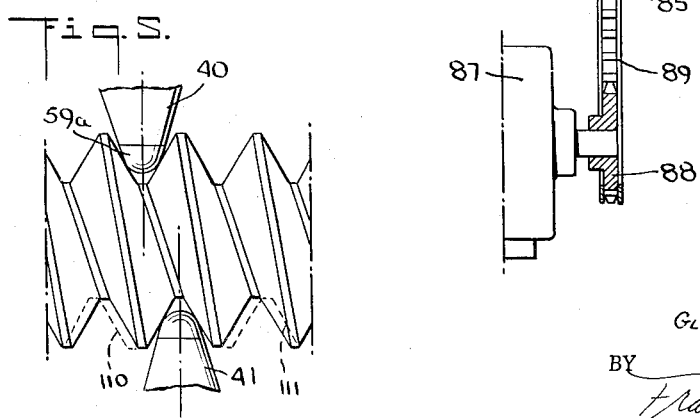
INVENTOR.
GLEN H. STIMSON
BY
his ATTORNEY March 14, 1961 G. H. STIMSON 2,974,418
HELIX TESTER
Filed June 12, 1958 6 Sheets-Sheet 4

INVENTOR.
GLEN H. STIMSON
BY
his ATTORNEY

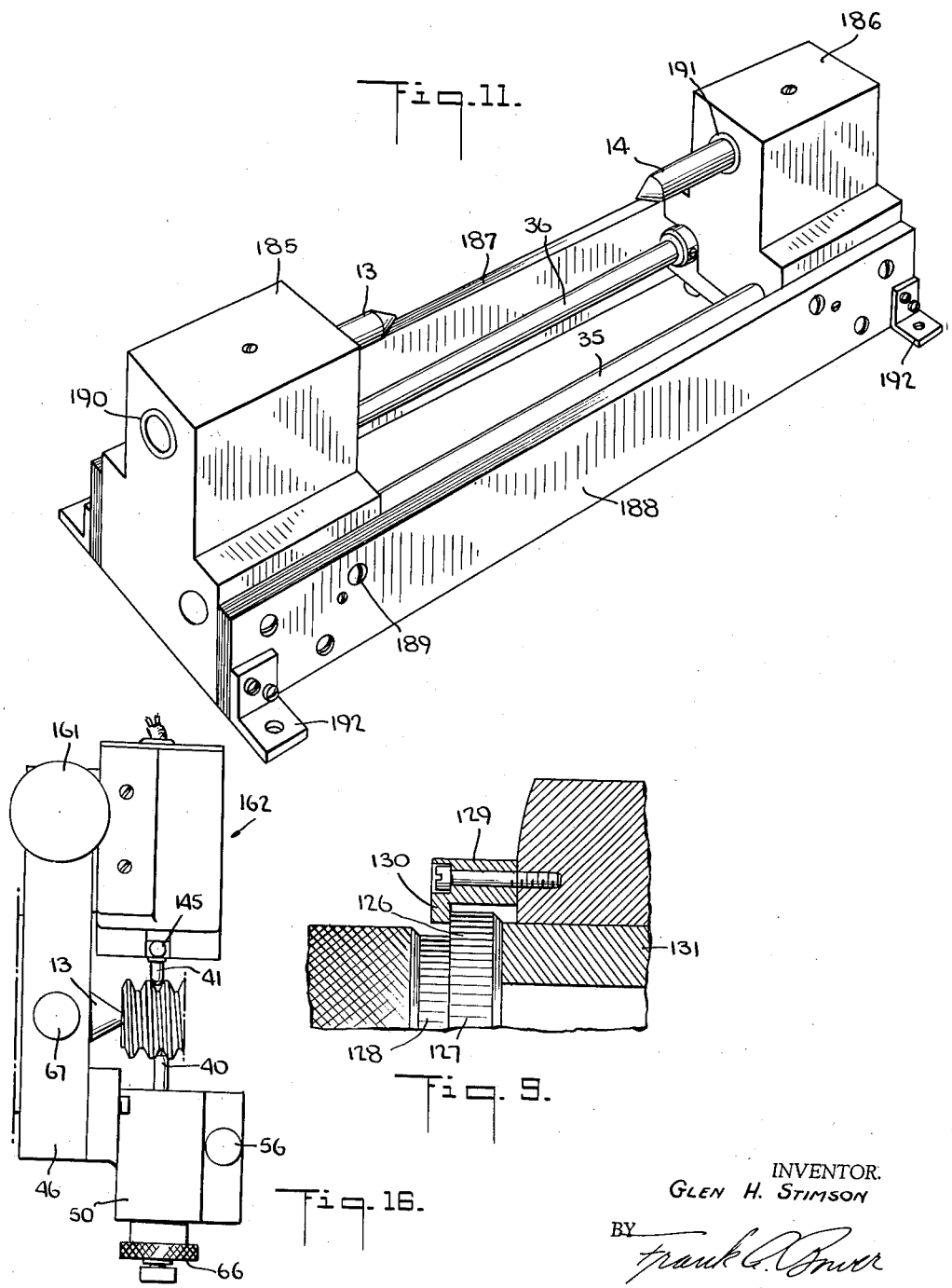
March 14, 1961
G. H. STIMSON
2,974,418
HELIX TESTER
Filed June 12, 1958
6 Sheets-Sheet 5
INVENTOR.
GLEN H. STIMSON
BY
his ATTORNEY March 14, 1961
G. H. STIMSON
2,974,418
HELIX TESTER
Filed June 12, 1958
6 Sheets-Sheet 6
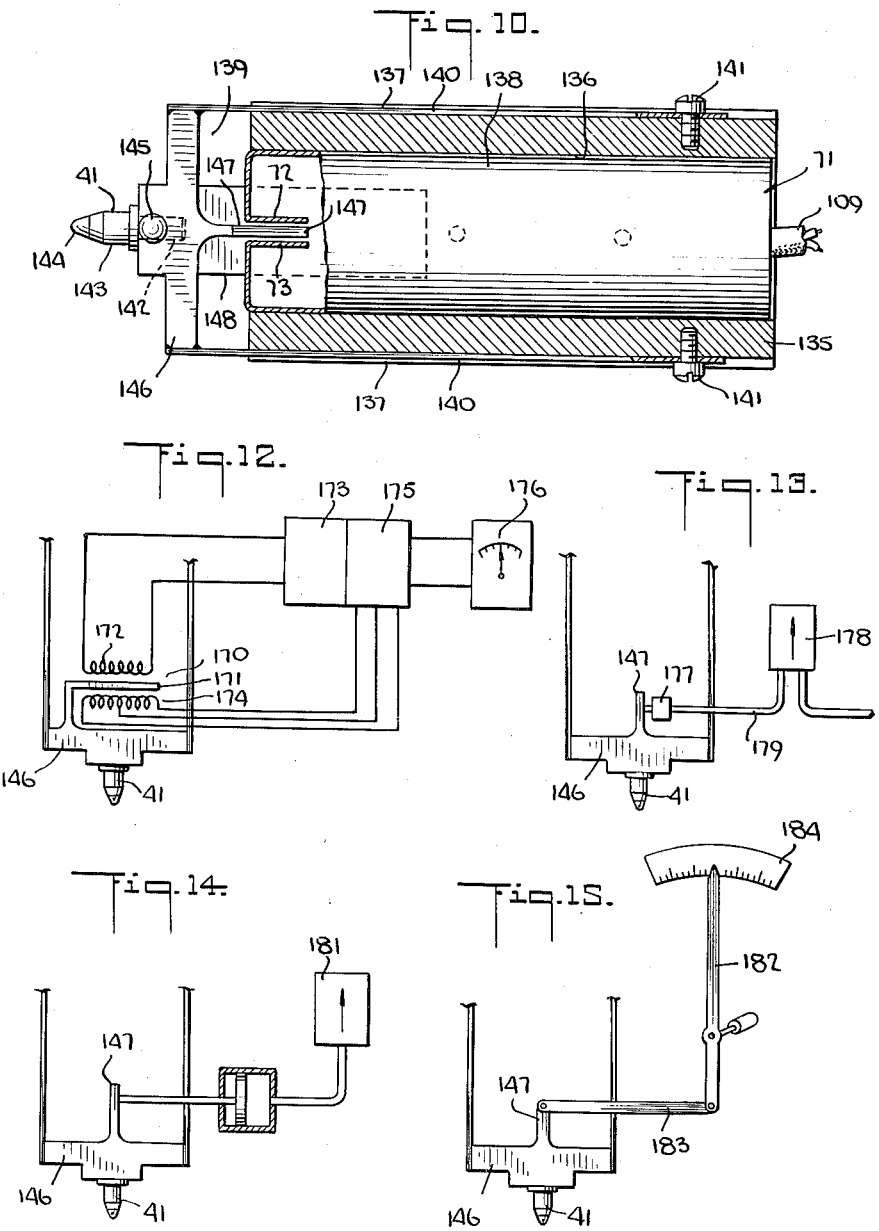
INVENTOR.
GLEN H. STIMSON
BY
his ATTORNEY United States Patent Office 2,974,418
Patented Mar. 14, 1961

2,974,418

HELIX TESTER

Glen H. Stimson, Greenfield, Mass., assignor to United-Greenfield Corporation, a corporation of Delaware Filed June 12, 1958, Ser. No. 741,585

12 Claims. (Cl. 33—199)

This invention relates to means for testing the uniformity of the surfaces of threads and is directed particularly to determining the departure of the surfaces of the external helical threads of a gage from a true helix.

In the manufacture of screw threads for plug type gages the advance of the helix of the thread should be constant for each portion of the thread. A deviation in the advance of the flank surfaces of the thread from a true helix will cause the effective or apparent pitch diameter of the thread to change. In the case of a thread plug working or setting gage it will result in a larger effective pitch diameter on the threads of the gage. Such gages may pass a threaded hole that is too large or reject an acceptable threaded hole as being too small, depending on the type of gage involved.

In testing a product with a go plug gage, if deviations in the helix advance are present, the gage will not enter a threaded hole with as small a pitch diameter as a gage with a true helix advance since the gage with deviations from the true helix will have a larger effective pitch diameter. Therefore, a gage with deviations from the true helix could reject a product which a gage without deviations from the true helix would accept. A not go plug gage having deviations from the true helix which produce a larger effective pitch diameter will pass a product that a not go plug gage with no deviations would reject. Thread ring gages set with plug thread gages will be incorrectly set if the plug thread gage has deviations from the true helix that increase the effective pitch diameter. A go thread ring gage set with a thread plug gage that has deviations from the true helix resulting in a larger effective pitch diameter could pass a product which is beyond the maximum limit. A not go thread ring set with a thread plug gage that has deviations from the true helix resulting in a larger effective pitch diameter could reject a product that a thread ring gage set with a thread plug gage with a true helix would pass.

The uniformity in the advance of the helix may be checked by measuring the lead with conventional lead checking instruments which measure the distance of advance over one or more threads. However, in the case of a deviation having a reptitious pattern which varies from a plus to a minus deviation from the true helix, the lead measured over a number of threads may be accurate while the advance of the helix of the thread may be inaccurate over sectors of a particular thread. Such inaccuracies will cause the gage to incorrectly test a threaded product as previously described. A helix or thread with this type of deviation is referred to as a "drunken helix" and is produced primarily in the grinding of the flank surfaces of the threads. This deviation can be reduced to within allowable limits for gages by a subsequent ring lapping of the gage after the grinding of the threads.

It is, therefore, desirable to provide a testing apparatus which accurately tests the uniformity of the helical advance for each convolution of the gage over the threaded length. It is also desirable that the testing apparatus be operated by a simple manipulative procedure so that anyone with a minimum of instruction may insert the gage and accurately test the helical advance.

An object of the invention is to provide an apparatus that measures each increment of the entire length of the flank surfaces of a thread to detect deviations of the surfaces from a true helix by utilizing the helix of the thread as the basis from which the deviation is detected.

Another object of the invention is to graphically represent the deviations and relate the graphic representation of the deviation to that portion of the helical surface deviating from the true helix.

Other and further objects of the invention will become apparent from the following description taken in connection with the drawings in which:

Fig. 3 is a sectional view taken along lines 3—3 of Fig. 2 to illustrate the relationship of the measuring members and sectionally illustrates the driving probe along lines 3a—3a;

Fig. 4 is a side fragmentary view illustrating the mounting of the gage and the means for rotating the gage;

Fig. 5 is an enlarged view of the thread of the gage and the measuring members in contact therewith;

Fig. 9 is a fragmentary side view of the collar plates clamping the knurled adjusting sleeve to the carriage with the collar plate and bushing shown in a section taken along lines 9—9 of Fig. 8;

Fig. 10 is a sectional view of the transducer taken along lines 10—10 of Fig. 7;

Fig. 11 is a perspective view of another embodiment of the support for the carriage and centers;

Figs. 12–15 schematically illustrate various embodiments with a feeler in contact with the flanks of the thread; and Fig. 16 illustrates a fragmentary top view showing the relationship between the probes on the carriage and the threaded gage.

Figure 2:
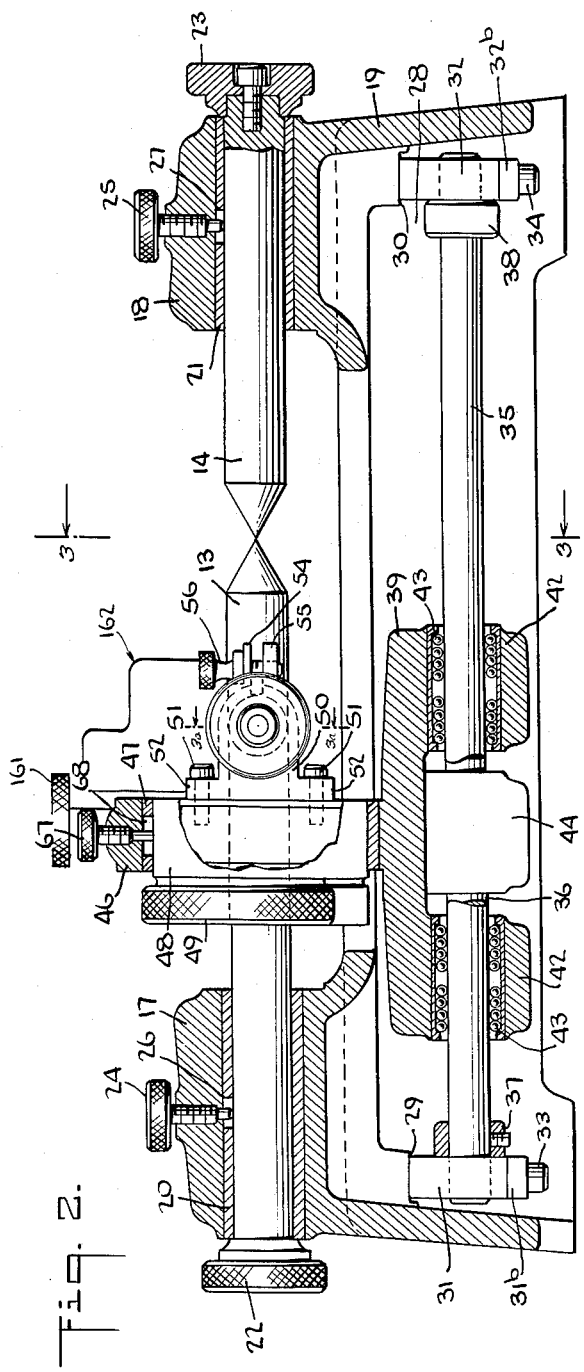
Fig. 2 is a sectional view of the helix tester taken along lines 2—2 of Fig. 1.

As illustrated in Fig. 4, the gage 10 has a shank 11 and an external thread 12. At each end of the gage are axially aligned recesses into which the conical ends of the fixed centers 13 and 14 fit to rotatably support the gage about the central axis. The threads 12 have continuous helical surfaces 15 and 16. The centers 13 and 14 are mounted in spaced blocks 17 and 18 on the base 19 (Fig. 2).

The blocks 17 and 18 have axially aligned bores with bushings 20 and 21, respectively, and the centers 13 and 14 are slidably mounted in the bushings to extend into the space between the blocks. Knurled knobs or caps 22 and 23 are secured to the centers for positioning the centers. The blocks have lock screws 24 and 25 threaded thereon and extending through openings 26 and 27 in the bushings to hold the centers in position and prevent movement.

The base 19 extends below the blocks 17 and 18 to form an inner space 28. At opposite ends of the space and underneath the blocks, finished surfaces 29 and 30 are provided to which mounting blocks 31 and 32 are secured by means of bolts 33 and 34. Shafts 35 and 36 extend through the space 28 parallel to the axis of the centers 13 and 14.

The carriage 39 is slidably mounted on the shafts 35 36 and is moved longitudinally along the gage 10 by the driving probe 40. The carriage has three bearing blocks. The two bearing blocks 42 are slidably mounted on the shaft 35 and the bearing block 44 is slidably mounted on the shaft 36. The bearing blocks 42 have bearings 43 and the bearing block 44 has a bearing 45. The bearings provide an easy rolling contact between the shafts 35 and 36 and the carriage 39 and accurately mount the carriage over the full length of travel on the shafts. The shafts 35 and 36 have accurately machined cylindrical surfaces and are mounted in the blocks 31 and 32 so that the cylindrical surfaces are parallel to the axis of the gage over their entire length. The bearings and the cylindrical shafts maintain the carriage in precise relation to the axis of the gage 10. As the carriage moves, this relation is maintained within very close tolerances so that any error introduced in the measurement of the helical surfaces by the movement of the carriage along the shafts 35 and 36 does not exceed the allowable error.

The shaft 35 fits snugly in the blocks 31 and 32 with its axis parallel to the axis of the spindles 13 and 14 and is secured against axial movement by the collars 37 and 38 securely fixed to the shaft. The shaft 36 fits in slots in the mounting blocks 31 and 32 and is held in place by supporting plates 31b and 32b having studs fitting in the slots to support the shaft 36 so that the entire length of the shaft has a slight horizontal play. The shaft 36 moves solely in the horizontal plane and is held from movement in the vertical plane by the weight of the shaft 36 and by the weight of the carriage and its components. Horizontal movement of the shaft 36 is permitted to allow freedom of movement to the bearing block 44 in Fig. 2. In Fig. 3 the plates are securely fastened in position by bolts 33. In this figure a detailed side view of the mounting block 31 is illustrated. Two bolts 33 are provided to fasten the plate 31b against the bottom of the block. The stud fits in the slot 31a to hold the shaft so that it may move in the horizontal plane. The walls of the slot hold the shaft against vertical movement and restrict the movement of the shaft solely in the horizontal plane.

The carriage 39 has a ring-shaped support 46 with an inner annular finished surface defining an opening (Fig. 2). The support 46 is positioned around the axis of the centers. A bushing 47 fits in the support to form an accurately finished cylindrical surface with the axis of the cylindrical surface coinciding with the axis of the centers so that the surface is coaxial with the centers. This relation is maintained as the carriage is moved along the shafts 35 and 36 of the carriage support. A probe supporting ring 48 has an outer finished cylindrical surface fitting snugly in the bushing 47. A circumferential knurled portion 49 extends axially from the ring to rotate or axially shift the supporting ring 48. Thus, the driving probe 40 may be positioned over a range of angles in relation to the transducer feeler probe 41 (as best illustrated in Figs. 3 and 5) and moved axially along the gage to properly seat the tip against the surfaces of the threads.

Figure 7:
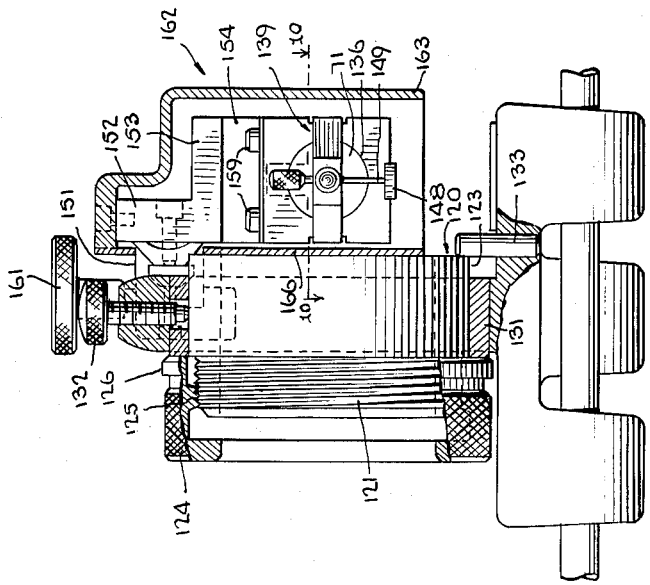
Fig. 7 illustrates a side view of another embodiment of the carriage with the driving probe support and the front cover of the transducer casing omitted, and with the probe supporting ring in full and the ring support in section along lines 7—7 of Fig. 8.

In Fig. 7 another embodiment of the probe supporting ring is illustrated in connection with another embodiment of the carriage. In this embodiment the probe supporting ring 120 has a threaded surface 121 extending coaxially to the outer finished cylindrical surface 123. The threaded surface is integral and formed as a single piece with the probe supporting ring and this embodiment has a lesser diameter than the outer cylindrical surface. A separately knurled sleeve 124 is provided with an inner threaded surface 125 complementary to the outer threaded surface 121. The knurled sleeve has a concentric cylindrical portion 126 extending coaxially with the complementary threaded portion 125 to space the complementary threaded portion from the probe supporting ring and engaging the side surface of the bushing 131. The concentric cylindrical portion has a flange 127 forming a groove 128. Two collar plates 129 are diametrically located on the ring support and have fingers 130 fitting into the groove to hold the knurled sleeve against the bushing. By unlocking the set screw 132 the probe supporting ring 120 may be moved axially in minute incremental amounts by rotating the knurled sleeve. Thus, the driving probe 40 may be positioned at any desired angle by the rotation of the supporting ring 120. The probe 40 is then adjusted axially along the thread of the gage by rotation of the knurled sleeve 124. The threaded surfaces 121 and 125 provide a very gradual movement of the driving probe axially along the threads of the gage.

Thus, the probe 40 may be accurately and sensitively positioned and seated to properly engage the flanks of the threaded gage. The axial movement of the probe supporting ring toward the gage is limited by the pin 133 fitting in the carriage. As the knurled sleeve is rotated, it is held axially by the collar plates and the probe supporting ring moves axially without rotating. The probe is locked in position by tightening the set screw 132. This is the preferred form of the probe supporting ring.

The driving probe supporting bracket 50 is secured to the side of the ring by means of bolts 51 passing through the flanges 52 on the bracket. The bracket has a cylindrical bore for holding the probe sleeve 53 and has a split side with flanges 54 and 55. A bolt 56 passes through one flange and is threaded in the other to securely grip the sleeve 53 in the bracket. The sleeve has a small bore 57 extending axially through one-half of the sleeve and a second axially aligned bore 58 which is larger in diameter than the bore 57. The probe 40 has a cylindrical shape with a conical point 59 at one end with a rounded tungsten carbide tip 59a for engaging the flanks of the threads of the gage and a flange 60 at a midpoint having a diameter larger than the bore 57 and smaller than the bore 58. The probe extends through the sleeve and the flange 60 engages the shoulder 61 between the bores 57 and 58. A helical spring 62 fits in the bore 58 around the probe and is held in compressed condition by the spring seat 63 fitting in the bore 58 and securely held by a lock screw 64. The spring 62 presses against the flange and holds the probe in engagement with the threads of the gage 10. The end of the probe extends through the seat 63 and a knob or cap 65 is secured thereto for manually moving the probe in and out of engagement with the threads of the gage. The probe sleeve 53 has a knurled knob 66 for positioning the sleeve in the bracket 50. The position of the probe can thus be adjusted to adapt the tester to different size gages. Thus, the probe can be adjusted so that the proper spring pressure is applied to the threaded gage to maintain the probe in contact relation with the threads and yet not damage the flanks and allow for changing of the entire probe assembly to accommodate threads of varying pitch. The probe supporting ring 48 may be rotated and moved axially in the bushing 47 by loosening the lock screw 67 threaded in the ring-shaped support and extending through an opening 68 (Fig. 2) in the bushing 47 to engage the probe supporting ring.

Figure 8:
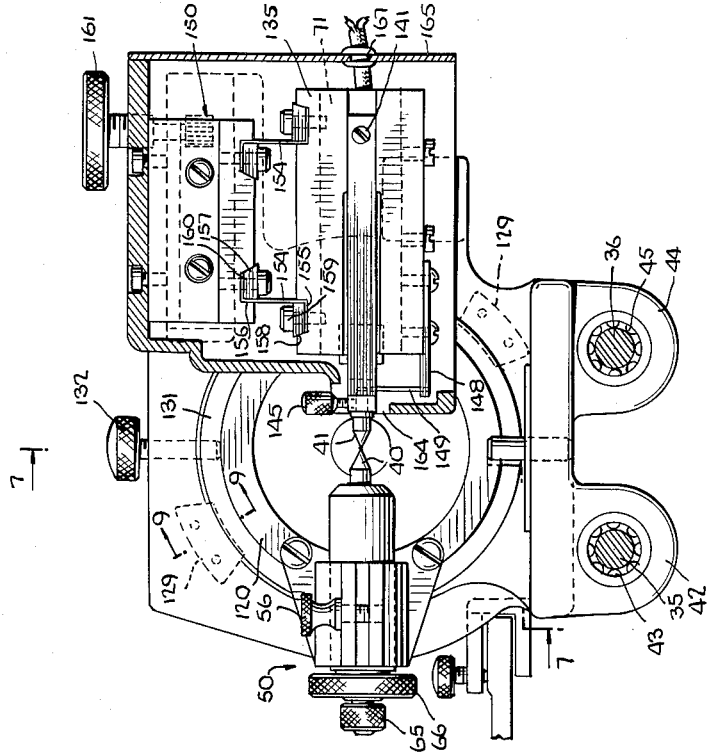
Fig. 8 illustrates a front view of another embodiment of the carriage.

The transducer probe 41 is delicately mounted on the ring-shaped support in fixed relation to the support (Fig. 3). The ring-shaped support has a bracket 69 integral therewith extending in a plane parallel to a center line through the probes 40 and 41. The bracket has an elongated slot extending in a similar manner for adjustably supporting an electronic transducer unit (Fig. 8). The probe 41 extends radially in relation to the gage and makes contact with the helical surfaces.

In Figs. 8 and 10 enlarged views of the transducer are illustrated. The transducer is supported by a rectangular shaped block 135 with a large cylindrical bore 136 extending longitudinally therethrough and with grooves 137 extending longitudinally in opposite walls. The components of the transducer unit are mounted within a cylindrical container 138 fitting in the bore. The feeler probe 41 is mounted on a yoke 139 having spaced parallel reeds 140 fitting in the longitudinally extending grooves 137 and secured to the block at the ends of the reeds opposite to the probe by means of bolts 141. The feeler probe 41 has a generally cylindrical shape with a cylindrical portion 142 fitting in the yoke and a second cylindrical portion 143 extending from the yoke and having an inner bore for receiving a tungsten carbide tip 144 having a rounded end for engaging the flanks of the thread of the gage. The tip of the probe is conical in shape, except for the rounded tungsten carbide tip portion. The feeler probe 41 is securely held in place by means of a set screw 145 threaded into the cross piece 146 and fitting in a countersink in the cylindrical portion. Means are thus provided for changing the feeler probe 41 to accommodate threads of varying pitch. The crosspiece is attached to the reeds which are preferably made of a spring steel. On the opposite side of the crosspiece from the feeler probe a finger 147 extends normal to the cross piece to fit within the end of the container 138 and between the condenser plates 72 and 73 of the transducer unit. Movement of the feeler probe by the flanks of the thread will produce a corresponding movement of the finger which will vary the capacitance of the plates of the transducer unit. A plate 148 secured to the block extends underneath the crosspiece and has a fine piece of wire 149 (Fig. 8) secured thereto. The other end of the wire is secured to the crosspiece to limit the movement of the feeler probe to a plane through the axis of the threaded gage.

The transducer block 135 (Fig. 8) is adjustably secured to the carriage by means of the mounting block 150 and an adjustable clamp member 151 (Fig. 7). The mounting block has a generally L-shape with one member 152 facing the bracket and the other member 153 facing the transducer block. The transducer block is resiliently supported by strips 154 extending laterally across the block. The strips are made of spring steel and are securely fastened to the transducer block and the mounting block by fitting them in grooves 155 and 156 and then securely clamping the strips by means of strip lock blocks 157 and 158 and bolts 159 and 160 extending therethrough. The grooves and blocks have laterally extending sloped surfaces which tightly wedge the blocks against the strips. The mounting strips are resilient and produce a resilient axial play to the transducer unit which provides a seating force for firmly holding the rounded tip of the feeler probe against the flanks of the thread. The feeler probe 41 is thus resiliently supported to move axially and have an axial force applied thereto and to resiliently shift laterally for measuring deviations in the flanks of the thread. The residient mounting of the feeler probe 41 provides a linear movement of the probe in relation to the drunkenness of the thread helix. The resiliency provides a slight axial movement of the probe so that as the probe is deflected in response to drunkenness, it maintains its position in relation to the axis. Also, the resilient mounting permits the probe to shift transversely in response to changes in the actual pitch diameter of the thread while maintaining its relation to detect drunkenness. The transducer unit may be moved to laterally adjust the feeler probe in relation to the central axis so that the position of the feeler probe may be set for various diameter gages. This adjustment is accomplished by turning the knob 161. The gear 161a engages a rack 161b on the block 150.

The transducer unit has a housing 162 for encasing the mounting block and the transducer supporting block. The housing comprises a cover 163 extending longitudinally along the exposed side and along the end facing the driving probe. The cover is fastened to the upper surface of the mounting block by means of bolts. A window 164 is provided in the end cover through which the feeler probe and the fastening set screw extend. A rear-end cover 165 is provided by the plate and a side cover 166 is provided on the side adjacent to the ring-shaped support. The side cover is mounted from the rear and has a slot to fit the cover around the adjustable clamp member and permit the adjustment of the unit. Both the side cover and the end cover are secured to the main cover by bolts. The cable to the transducer unit extends through the opening 167 in the back plate.

Figure 6:
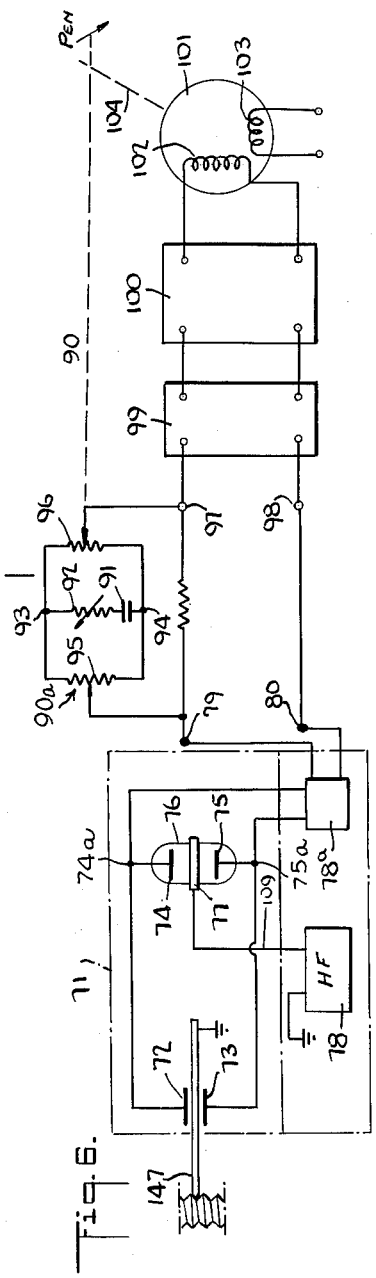
Fig. 6 is a diagram of the electrical circuit.

The transducer unit 71 is schematically illustrated in Fig. 6 in connection with the recording unit. In this figure the finger 147 is resiliently held between condenser plates 72 and 73. The condenser plates are connected to the electrodes 74 and 75 of a gaseous discharge tube 76. The gaseous discharge tube has a third ionization electrode 77 exterior to the tube. A high frequency voltage is provided by a high frequency source 78. On deviation of the finger 147 a direct voltage is produced across the terminals 74a, 75a and impressed on the amplifier 78a. The transducer unit is set so that when the probe is in a given position, the output direct current voltage across the terminals 79 and 80 is zero. However, on flexure of the finger 147 relative to the plates the balance of the circuit is upset and a voltage appears across the terminals 79 and 80 which is proportional to the movement of the finger 147. The magnitude of the error signal produced by the transducer unit is directly proportional to the flexure of the finger 147. Thus, a direct voltage value is secured corresponding to the amount of the deviation of the finger 147. In an application of this unit for testing the gage 10 for a drunken helix type of error the variation of the probe and the attached finger measure the variation of the helical surface in following a drunken helix pattern.

The deviation is measured by rotating the gage 10 (Fig. 4). This is accomplished by mounting on the center 14 a bushing 81 and a sprocket 82 on the bushing 81. The sprocket rotates on the bushing and has a groove 83 at the end adjacent to the block 18. A retainer 84 is mounted on the face of the block and has a finger portion 85 fitting in the groove to hold the sprocket axially while rotating on the bushing 81. A yoke 86a is mounted on the hub of the sprocket and engages a dog 86 secured to the shank 11 of the gage. The sprocket 82 is rotated by a motor 87 with a sprocket 88 mounted inside the base 19 and coupled to the sprocket 82 by a timing belt 89. The centers 13 and 14 are fixed so that the gage 10 does not move axially on rotation by the driving mechanism. The feeler probe 41 is moved along the thread of the gage by means of the probe 40 engaging the thread and moving the carriage 39 by movement of the probe 40 with the advance of the thread, as shown in Fig. 16. Thus, the feeler probe 41 is brought into measuring relationship with the entire length of the helical surfaces.

The deviation of the thread from the true helix is determined by the axial variation of the feeler probe 41 in relation to the driving probe 40. The probe 40 is positioned angularly and axially in relation to the feeler probe 41. The angular relation remains fixed during the measurement of the helical surfaces of the thread. The predetermined axial relation does not vary if the flanks of the thread follow a true helix. When the helical surfaces vary from a true helix, the probe 41 can no longer maintain the predetermined relationship with the driving probe 40 since it will be flexed in one axial direction or the other by the deviating helical surfaces. This flexure will record or indicate a deviation from the true helix. The probe 40 may be positioned at any angle in relation with the feeler probe 41. Usually, the probe supporting ring 48 is set to position the driving probe 40 in relation to the feeler probe 41 over a range of 81° to 180°. In the case of the measurement of the drunken helix type deviation the minus deviation and the plus deviation are usually 180° apart and the probe may be positioned at any angle. However, in the case of a harmonic deviation the probe 40 should preferably be positioned at about 90° to the feeler probe.

Figure 1:
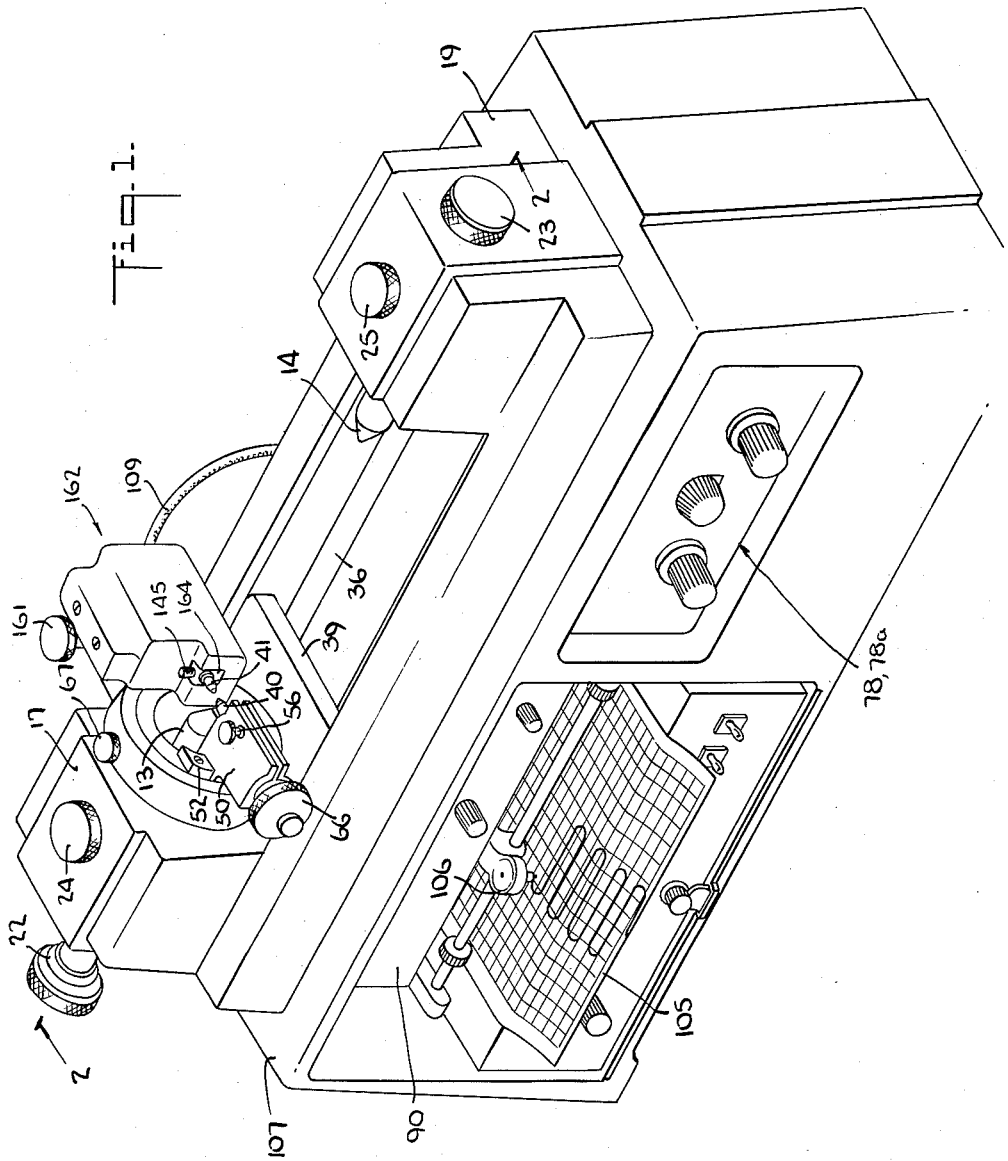
Fig. 1 is a perspective view of the helix tester.

The error signal is amplified and fed to a recording unit which is illustrated in Fig. 1 and the circuit of which is diagrammatically illustrated in Fig. 6. In a well-known recording unit 90 a measuring network 90a is provided comprising a substantially constant voltage measuring cell 91 in series with an adjustable resistor 92 for determining a given reference voltage across the terminals 93 and 94. Across the terminals 93 and 94 potentiometers 95 and 96 are connected. The adjustable contact of potentiometer 95 is connected to the terminal 79 of the transducer unit to produce an error voltage across the network. When a true helix is being followed, the contact point of the potentiometer 96 is set so that there is a zero error signal across the terminals 97 and 98. On the occurrence of a deviation from the true helix an error voltage is produced across the terminals 79 and 80 which unbalances the network 90a and produces an error signal across the terminals 97 and 98. This signal is fed to a chopper circuit 99 which produces an alternating square wave. The direct current error signal across the terminals 97 and 98, depending on the polarity, either adds to or subtracts from the chopper signal. The alternating square wave signal is fed to an amplifier 100 which amplifies the square wave signal. This signal is supplied to the winding 102 of the motor 101. The winding 103 is connected to an alternating voltage. The shaft 104 is coupled with the contact point of the potentiometer 96 and when there is a zero error voltage across the terminals 79 and 80, the windings 102 and 103 are in balance and there is no tendency to rotate the shaft 104. However, on the occurrence of an error signal the windings are unbalanced and the shaft 104 is rotated. This rotation is in a direction to adjust the contact of the potentiometer 96 to match the error voltage across the terminals 79 and 80 and reduce the error signal across the terminals 97 and 98 again to zero and thus stop the rotation of the shaft. On the occurrence of a variable error voltage, the motor will drive the shaft 104 in response to the variations in an attempt to keep balancing the circuit 90. The shaft 104 is connected to a suitable recording apparatus. This apparatus is fragmentarily illustrated in Fig. 1 and comprises a graph sheet 105 which is continuously driven at a constant rate and a marking means 106 which is coupled to the shaft 104 and moved in response to its rotation. Thus, as illustrated in Fig. 1, a continuously changing deviation such as that which occurs in a drunken helix produces a wavy line. If there is no deviation, then a straight line is produced on the graph. Thus, the nature and magnitude of the deviation are clearly recorded. Further, since the travel of the marking means corresponds to the movement of the thread, the point of deviation can be located on the threaded gage from the graph.

In this embodiment the recording unit 90 and the high frequency source 78 and the amplifier 78a are enclosed in the casing 107. The high frequency unit and the amplifier are connected to the transducer unit 71 by a cable 109. The amplifier is connected to the recording unit and transmits the error signal thereto. An electric meter with a dial to visually indicate the deviations may be substituted for the recorder where a record or graph is not required. The cable 109 has sufficient length to permit the carriage to travel the full distance between the blocks.

Thus, it may be seen that as the gage is rotated, the driving probe 40 moves the carriage supporting the transducer probe 41. The driving probe 40 and the transducer probe 41 are in a set relation so that if the flanks of the thread follow a true helix, no error voltage is produced in the transducer unit, or if the transducer unit is set to produce a voltage, the measuring network of the recording unit 90 is set to nullify this error voltage so that a zero error signal appears on the terminals 97 and 98. As the transducer probe moves axially along the rotating threads 12, the trueness of the flank surfaces is tested. If the flanks should deviate to increase the advance of the thread as indicated by the dotted lines 110, thereby producing a positive deviation, the transducer probe 41 would be flexed from the set position in relation to the driving probe 40 and would produce an error signal. This signal is proportional to the amount of flexure. If the flanks of the thread deviate to reduce the advance as indicated by the dotted lines 111, the probe 41 would be flexed in the other direction from the set relation with the driving probe 40 and would produce an error voltage and signal of opposite polarity to indicate a minus deviation. In the case of a drunken helix type error, the plus and minus deviations are 180° apart and if the probes 40 and 41 are on diametrically opposite sides of the gage, they will engage the plus and minus deviation at the same time to give a strong recording of the deviation.

The carriage shafts 35 and 36 are supported in relation to the centers 13 and 14 to maintain the parallel relation of the shafts with the central axis of the centers so that as the carriage moves along the shafts, the position of the probes 40 and 41 in relation to the central axis is maintained and no error is introduced by the movement of the carriage along the threads of the gage. The gage may be quickly and easily inserted between the centers 13 and 14 by the loosening of the lock screws 24 and 25 and the adjustment of the centers 13 and 14 to accommodate the gage and by a relocking of the centers by the screws 24 and 25 to hold the gage axially in place.

The carriage may be positioned so that the probes 40 and 41 engage the threads to move the transducer probe 41 axially along the rotating gage. Thus, the entire length of the flanks of the gage may be easily tested and a record of the deviations presented immediately by the chart 105. The gage can then be subjected to possible correction by subsequent operations to remove the deviations and the gage reinserted for further testing. A record of the accuracy of the final trueness of the helical surfaces may be maintained for subsequent reference.

In Figs. 12 through 15 other types of transducer units for indicating the deviation or movement of the feeler probe are illustrated. The feeler probe is mounted in the same manner as previously described to provide a resilient mounting of the probe to respond to deviations in the flanks of the threads. In Fig. 12 a variable transformer 170 may be used to detect the movement of the transducer unit. The cross piece 146 of the transducer unit has a finger 171 extending parallel thereto and moving parallel to the motion of the feeler probe. This finger forms a variable iron core of the movable transformer 170. One of the windings 172 is connected to an alternating power supply 173 and the other winding 174 is connected to a rectifier and amplifier 175 connected between the power supply and the meter 176. The variations of the core vary the inductance of the transformer and produce a signal. This signal is detected and indicated by the meter 176, such as a recorder, or it may be connected to a dial-type meter where deviations are indicated by the movement of the hand of the dial.

In Fig. 13 the finger 147 engages an actuator 177 of an air gage system. The actuator is connected to an air gage 178 by means of a tube 179. The dial of the gage 178 is set to correspond to the predetermined relationship between the driving probe 40 and the feeler probe 41. When the feeler probe 41 varies on deviation in the helix of the thread, the pressure in the air gage system will be varied as the finger 147 moves. This variation is then indicated by the movement of the dial on the air gage 178.

In Fig. 14 a hydraulic system is shown coupled to the finger 147. A hydraulic piston is connected to the finger and as the feeler probe 41 varies, the pressure in the hydraulic system varies and the variations are indicated on the meter 181. In Fig. 15 the finger 147 is connected mechanically to a pointer 182 by means of linkage 183. The deviations in the helix are transmitted and increased in magnitude through the linkage and the pointer to indicate the deviations on a dial 184.

Although the invention has been described in connection with a particular embodiment and various modifications, it is understood that other modifications and changes may be made in the apparatus without departing from the scope of the invention while securing the same results in the accuracy and simplicity of testing the helices of a thread. In the foregoing embodiment the centers 13 and 14 are mounted in a single cast piece. The blocks 185 and 186 (Fig. 11) supporting the centers 13 and 14 may be separately made and then secured together by side plates 187 and 188 securely fastened to the blocks by accurately machined bolts 189. The side plates 187 and 188 maintain the aligned relation of the axes of the bushings 190 and 191 in the blocks. Angles 192 are secured to the side plates and a separately formed cover (not shown) may be bolted to the unit. The shafts 35 and 36 are mounted in the blocks 185 and 186 in a similar manner to the above described embodiment. The carriage 39 is thus accurately supported and maintains the relationship of the center of travel of the carriage with the aligned axes of the centers 13 and 14. This latter embodiment is the preferred form of mounting the centers in relation to the carriage.

Various other modifications and changes may be made in the apparatus without departing from the scope of the invention as set forth in the appended claims.

I claim:

1. Apparatus for testing and recording the deviation from the true helix of the helical surface of the thread of a gage comprising fixed, spaced centers axially aligned for rotatably mounting a gage in a fixed axial position, a transducer probe producing a signal on the flexure of the probe, an associated recording apparatus connected to said probe to graphically draw the degree of flexure of said probe, rail-like means extending parallel to the central axis of said centers, a carriage movably mounted on said rail-like means and having a driving probe extending radially for engaging the thread of a gage mounted between said centers in a fixed axial position to move said carriage axially along said central axis on rotation of a gage mounted between said centers in a fixed axial relation, said transducer probe mounted on said movable carriage to extend radially for engaging the threads of a gage in a non-flexed relation on engagement with a true helix and to progressively engage the length of a thread on movement of said carriage by rotation of a gage mounted in a fixed axial position between said centers and flex from said relation on engaging a deviation to mark the deviation on said recording apparatus.

2. Apparatus for testing the helical surfaces of the thread on a generally cylindrical implement comprising means for rotatably mounting an implement about the axis of the thread in a fixed axial position, a feeler probe engaging helical surfaces of the thread and shifting axially on deviation from a true helix, mounting means supporting said feeler probe in contact relation with helical surfaces and moving said probe axially along an axially fixed implement, a driving probe securely mounted on said mounting means to engage a thread of an implement in a given set relation with said feeler probe to move said mounting means and said feeler probe axially along an axially fixed implement so that the feeler probe engages the length of a thread and moves from the set relation on deviation of a thread from a true helix.

3. Apparatus for testing the helical surfaces of the external thread of a cylindrical gage comprising means for mounting a gage about its central axis in a fixed axial position, a feeler probe engaging the helical surfaces of the thread and shifting axially on deviation from a true helix, mounting means supporting said feeler probe in contact with the helical surfaces and moving said probe axially relative to a gage in an axially fixed position, a driving probe securely fastened to said mounting means to engage the thread of a gage in a set relation with said feeler probe and to move said feeler probe and said mounting means axially along a gage in a fixed axial position on rotation of a gage so that said feeler probe engages the length of the thread and moves from the set relation on deviation of the thread from the true helix.

4. Apparatus for testing the helical surfaces of a thread on a gage formed about the central axis of the thread comprising means for rotatably mounting said gage about its central axis in a fixed axial position, a feeler probe for engaging the helical surfaces of the thread and shifting axially on deviation from a true helix, movable mounting means for supporting said feeler probe in contact with said helical surfaces and moving said probe axially relative to said gage, a driving probe securely fastened to said mounting means to engage the thread of the gage on generally the opposite side of said gage to said feeler probe in a set relation with said feeler probe and to move said movable mounting means and said feeler probe axially along said gage in an axially fixed position on rotation of said gage so that the feeler probe engages the length of the thread and moves from the set relation on deviation of the thread from the true helix.

5. An instrument for testing and recording the deviations of the helical surfaces of the external thread on a gage from a true helix comprising a base having two spaced blocks each having a bore, the bores being coaxially aligned, centers mounted in said bores and extending into the space between said blocks and rotatably supporting said gage about its central axis, a carriage having a ring-shaped support encompassing the axes of said centers and gage, means mounted on said base for slidably supporting said carriage to move axially and parallel to the central axis of said gage, a transducer probe radially mounted on said ring-shaped support and engaging the thread of the gage to shift axially from a given position on deviation of the thread from a true helix, a probe supporting ring, a driving probe mounted on said probe supporting ring to engage the thread of said gage to move said carriage axially on rotation of said gage, said probe supporting ring movably mounted to adjust the space relation of said driving probe and said transducer probe, said transducer probe having means for creating an error signal on alteration of said space relation, and recording means responsive to the signal to graphically record the deviation.

6. An instrument as set forth in claim 5 in which said means for slidably supporting said carriage comprises two cylindrical shafts extending parallel to said central axis and said carriage has ball bearings engaging said shaft to maintain the parallel relation.

7. An instrument as set forth in claim 5 wherein said transducer probe and said driving probe are on opposite sides of said gage.

8. An instrument as set forth in claim 5 wherein said probe supporting ring is rotatably and slidably mounted in said ring-shaped support.

9. An instrument as set forth in claim 5 wherein means are provided for mounting said driving probe on said probe supporting ring and comprise a bracket having a radially extending passage, a sleeve slidably mounted in said passage, said sleeve having first and second axially aligned bores of different diameters, the lesser diameter bore being radially inward of said large diameter bore, said driving probe being of a cylindrical shape and having an intermediate flange, said probe slidably fitting in said first bore and said flange fitting in said second bore, a helical spring pressing against said flange to urge said probe radially inward against the threads of said gage.

10. Apparatus for testing the helical surfaces of the external threads of a cylindrical gage comprising means for mounting said gage to rotate about its central axis, probe supporting means mounted to move axially in relation to said gage mounting means, a driving probe for engaging the flanks of the threads of the gage, means for mounting said driving probe on said probe supporting means to extend radially in relation to the central axis and to rotate in the radial relation about said central axis for positioning in a range of angular relations, a feeler probe for engaging the flanks of the thread to follow the flanks as the gage is rotated, laterally extending resilient means for mounting said feeler probe on said probe supporting means for supporting said feeler probe to extend radially in relation to the central axis and to shift axially, said driving probe adapted to engage the threads to move said probe supporting means axially along the central axis to move the entire length of the helical surfaces in contact with said feeler probe, said feeler probe and said driving probe in a set relation for a true helical thread and said feeler probe moving from said relation on deviation from the true helix.

11. Apparatus as set forth in claim 10 wherein said laterally resilient means comprises spaced reeds connected at one end by a cross piece and secured at each opposite end to said mounting means, and said feeler probe being mounted on said cross piece to shift axially in relation to deviations in the helix of said threaded gage.

12. An apparatus for testing the helical surfaces of the external threads of a generally cylindrical gage comprising a fixed base, rail-like means mounted on said base for guiding in a linear direction, carriage means movably mounted solely in a linear direction on said rail-like means, fixed spaced centers mounted coaxially on said base and extending parallel to the movement of said carriage means and rotatably supporting the gage in a fixed axial position, a feeler probe mounted on said carriage to engage the helical surfaces of the thread and to vary longitudinally in response to deviations in the thread, a driving probe mounted on said carriage means and movable with said carriage means relative to said axially fixed gage, said driving probe engaging the helical surfaces of the threads of said gage, said feeler probe in a set relation with said driving probe for detecting a true helical surface, and said driving probe moving said carriage on rotation of the gage in a fixed axial position for determining the deviation of said helical surfaces from the true helix by variation of said feeler probe from the set relation.

References Cited in the file of this patent
UNITED STATES PATENTS

| | | |
|---|---|---|
| 1,904,130 | Garms et al. | Apr. 18, 1933 |
| 2,321,903 | Fox | June 15, 1943 |
| 2,763,068 | Starbuck | Sept. 18, 1956 |